March 19, 1946. N. OBENSHAIN ET AL 2,397,038
SEDIMENTATION BALANCE
Filed July 16, 1942 2 Sheets-Sheet 2
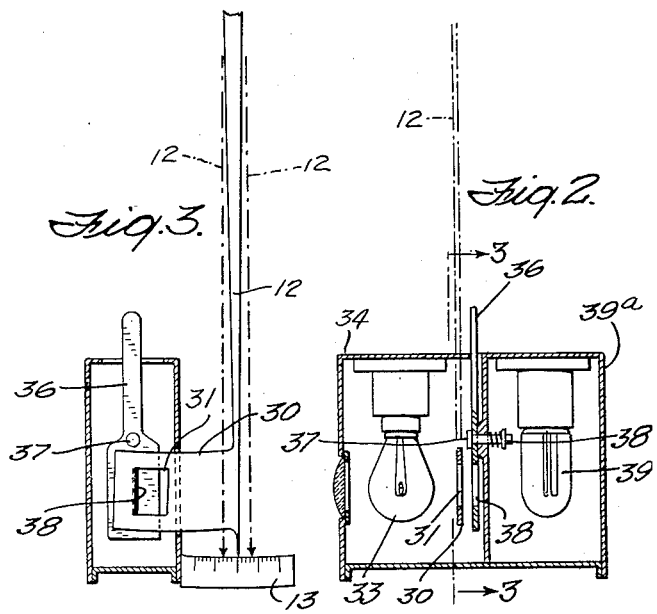
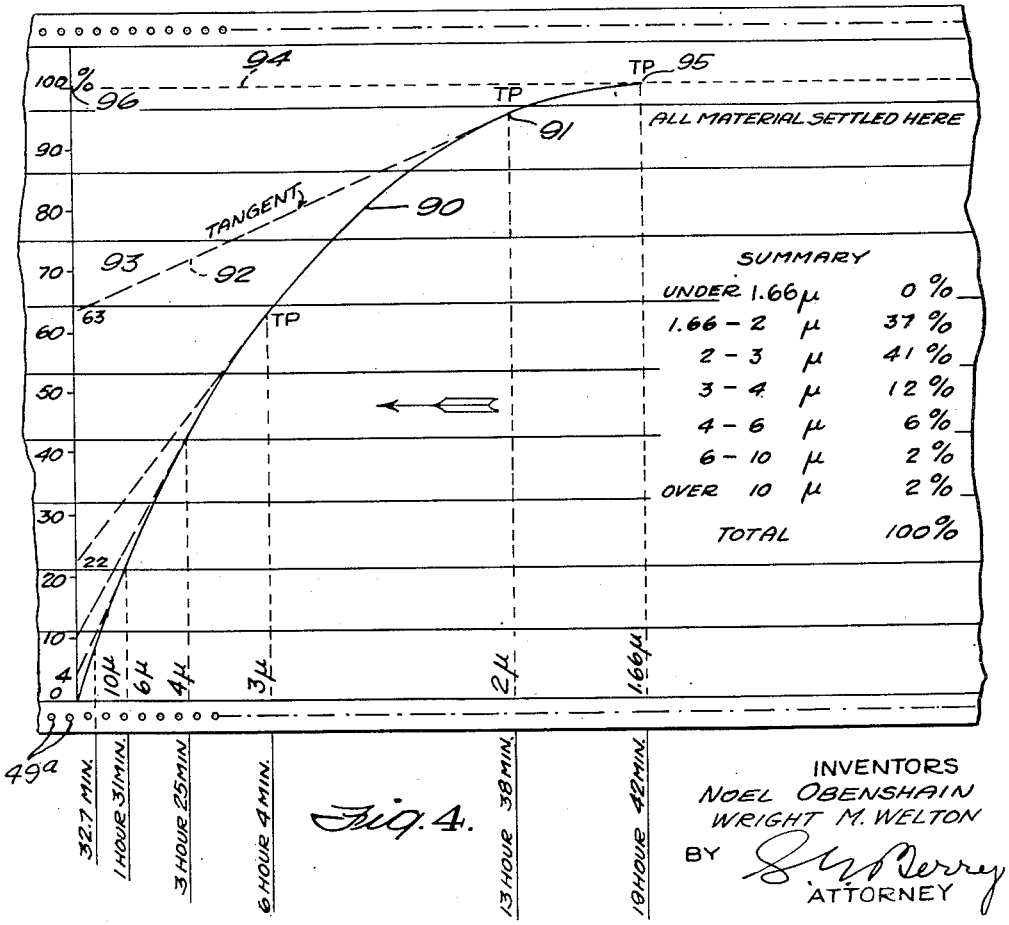
INVENTORS
NOEL OBENSHAIN
WRIGHT M. WELTON Patented Mar. 19, 1946

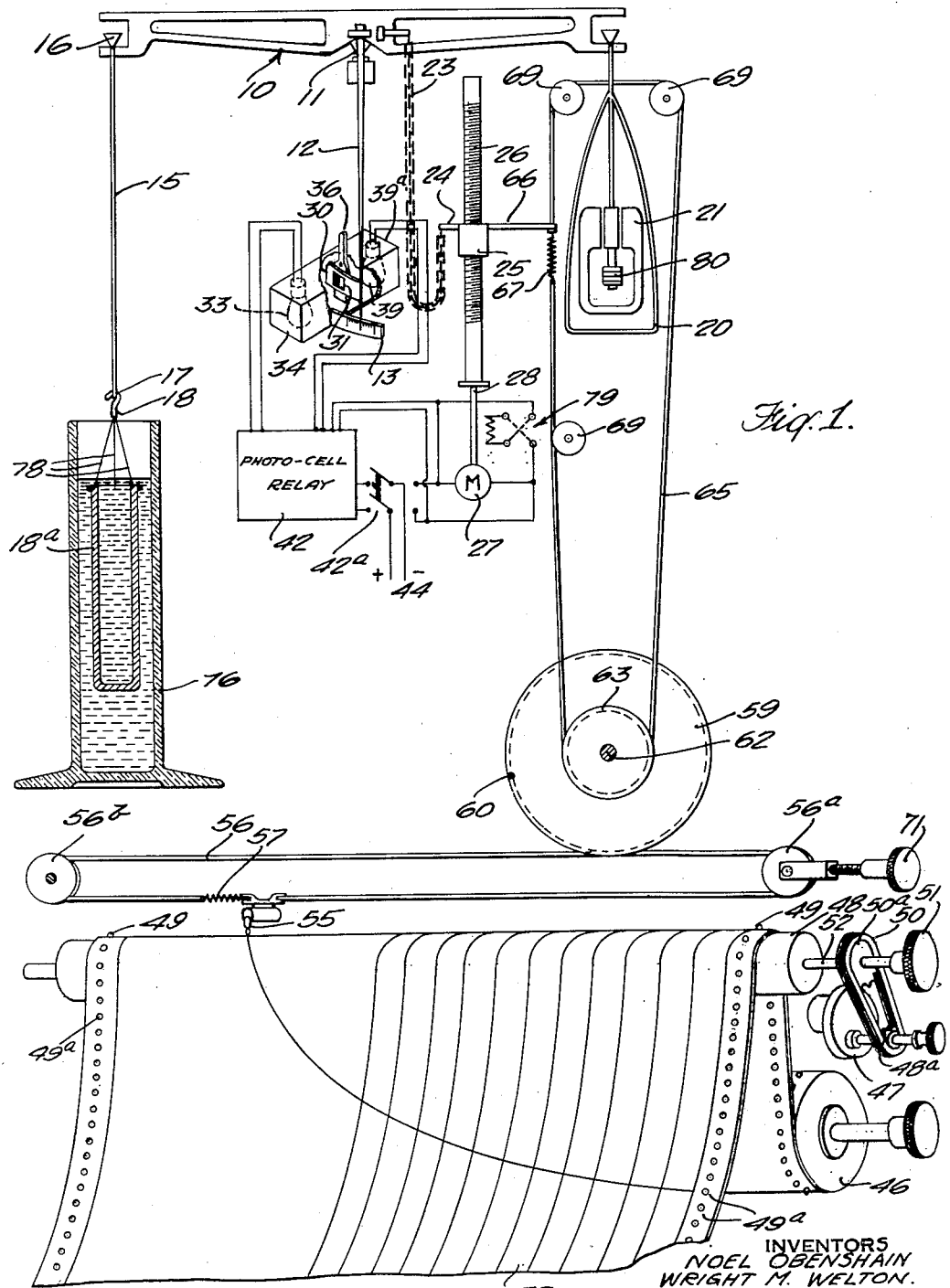

2,397,038

UNITED STATES PATENT OFFICE 2,397,038

SEDIMENTATION BALANCE

Noel Obenshain and Wright M. Welton, Piedmont, W. Va., assignors to West Virginia Pulp and Paper Company, New York, N. Y., a corporation of Delaware Application July 16, 1942, Serial No. 451,144

1 Claim. (Cl. 73—32)

Our present invention relates to recording sedimentation balances. The term "sedimentation balance" is applied herein to instruments of the type which weigh the amount of solids settling out of a suspension of said solids and find application in the determination of particle sizes in accordance with Stokes' law. In the application of Stokes' law for the determination of particle size it has been the practice heretofore to use a modified analytical balance in which one pan of the usual type is substituted by a pan suspended by a rod or wire and adapted to be immersed in a vessel containing a suspension of the solid whose size analysis it is desired to obtain. The balance having been brought to equilibrium, a small weight is placed upon the pan opposite the submerged pan and the elapsed time observed when the balance is brought again into equilibrium due to the weight of particles settling out upon the submerged pan. The process is repeated until sufficient data are obtained. The particle size may then be computed by use of the following formula derived from Stokes' law:

$$t = \frac{7650nh}{(d_1 - d_2)r_m^2}$$

wherein $t$ equals the time of settling in minutes, $n$ is the viscosity of the medium in poises, $h$ is the distance of settling in centimeters, $d_1$ is the specific gravity of the body, $d_2$ the specific gravity of the medium, and $r_m$ the radius of the body in microns (1 micron=.0001 cm.).

The object of our present invention is to provide a sedimentation balance in which the change in weight will be recorded automatically in an improved immersion element whereby errors inherent in prior devices are eliminated.

Other objects will be apparent as the description proceeds and the features of novelty will be pointed out in the appended claim. Our invention is more fully described in the accompanying specification and drawings in which:

Fig. 1 is a diagrammatic view partly in section of a preferred embodiment of our invention;

Fig. 2 is a sectional view showing a source of light and a photo cell actuating the photo cell relay, which in turn controls the movement of the counterpoise of the balance;

Fig. 3 is a view taken on line 3—3 of Fig. 2;

Fig. 4 is a view of a chart recorded by our improved apparatus.

In Fig. 1 is shown a modified analytical balance 10 having a fulcrum 11, pointer 12, and scale 13. As shown, the left arm of the balance has in lieu of a pan, a wire 15 suspended from knife edge 16, said wire terminating in a loop 17 to which is removably attached hook 18 of an immersion element 18a. The right arm, for example, may have fulcrumed thereto pan 20, and desirably a magnetic dampener 21 of known construction to prevent undue swinging of the balance. Balance 10 preferably is provided with a chain counterpoise 23, also of known construction, attached to the right arm thereof, the movable end of chain 23 being secured to a lug 24 on nut 25 which is in threaded engagement with a vertical shaft 26, turned by motor 27 through shaft 28.

Equilibrium of the balance is automatically maintained by the following mechanism: Attached to pointer 12 is a vane 30 having an aperture 31, Figs. 2 and 3, such vane being arranged to cut off light from lamp 33 in housing 34, which light, except for the unapertured portion of said vane and the unapertured portion of an orifice plate 36 pivoted at 37 and having an orifice slit 38, would shine on photo cell 39 in a housing 39a. When the rays from the lamp 33 are cut off from striking the cell 39, as when the immersion element 18a moves downward a slight amount, photo cell relay 42 (of known construction) is actuated to cut the motor 27 into line 44, line-connected switch 42a being thrown to the left, Fig. 1; the motor thereupon rotates the shaft 26 to bring the nut 25 downward a distance sufficient to add more of such additional weight of the chain 23 to the right arm of the balance as to cause the right hand arm to throw the pointer slightly to the left to thereupon cut in the light to the cell 39.

In order that this increase in weight may be recorded, the following mechanism may be provided: A chart 45 is unwound from a roll 46 at a constant rate by means of a motor 47, the chart passing over a platen 48 having pins 49 which engage marginal perforations 49a of the chart. The platen 48 is connected to the motor 47 through sprocket 48a, chain 50 and sprocket 50a. The chart may be zero set by means of knob 51 whose shaft 52 has a frictional engagement with sprocket 50a. A stylus 55 is held in engagement with the chart 45 by means of a cord 56, such cord 56 having preferably, as part of its circuit, spring 57 serving to keep the cord taut. Cord 56 also has as part of its circuit a loop around a pulley 59, such cord preferably being secured to such pulley at point 60, for example. Pulley 60 is journaled on the shaft 62, the support for which is not shown. Also on shaft 62 is a small pulley 63 over which passes a cord 65, one end attached to lug 66 of nut 25, cord 65 also having in its circuit a spring 67 to provide the necessary tension in the cord. Cord 65 also passes over idler pulleys 69, 69, 69, on supports not shown. Therefore, movement of the nut 25 causes a movement of translation of the stylus 55, and such movement may be suitably magnified by the ratio of pulleys 63 and 59. Ordinarily this ratio will be chosen so that the stylus will travel completely across the chart for the maximum travel of nut 25 on shaft 26. Spring 57 also permits slight adjustment of the initial position of the stylus 55 by turning nut 71, which moves pulley 58a and consequently the stylus.

In use the suspension to be tested is placed in the container 76, and the immersion element, cup 18a, connected with the hook 18 by fine wires 78, is immersed in such suspension. The balance is placed in equilibrium by first running the nut 25 bearing the end of chain 23 upwardly of the shaft 26. To do this a motor reversing switch 79 is turned and then switch 42a is thrown to the right, Fig. 1, thereby cutting out photo cell relay 42 and cutting motor 27 directly into line 44. If equilibrium is not reached at the region of the upper limit of travel of the nut 25, the weights 80 are adjusted until this condition occurs. (Or a weight may be placed on pan 20.) The pivoted orifice plate 36 is adjusted so that balanced position of the pointer agrees with the center or zero point of scale 13. The stylus 55 and the chart 45 are adjusted so that the stylus starts its travel at a marked origin at the right hand side of the chart.

Fig. 4 shows a chart having a curve 90 which has been traced by the stylus 55, such chart representing the results of a test on a suspension of precipitated chalk in water. The curve 900 shows the relative increase in weight of the settled material plotted against time but does not give direct readings in particle size. However, from Stokes' law the time required for particles of any given size to settle out can be calculated, and in Fig. 4, for example, it will be noted that particles of two microns ($2\,\mu$) settle out in a period of thirteen hours thirty-eight minutes. Other size particles have been calculated similarly. Thus, to find the percentage of particles up to the size of two $\mu$ that have settled out (in the example given all material settled out) a tangent is drawn at the point 91 where the two $\mu$ ordinate intersects the curve 90. This tangent 91 will intersect the Y axis at a point 93. Previously the tangent 94 has been drawn from the point 95 at which point all (100%) of the material had settled. The intersection of the tangent 94 with the X axis at 96 may be taken as representing 100% settled out, and the distance 0—96 may be divided into percentage units, such that 100% is at point 96 and 0% is at the origin (0). It may thereupon be demonstrated that the difference in percentage readings at point marked 93 and point marked 96 is that of particles between 1.66 $\mu$ (the value at the time when all particles settled out) and 2 $\mu$. In this case the percentage would be $$100\% - 63\% = 37\%$$

Other values are calculated similarly, as indicated in the table in Fig. 4. Thus the form in which the curve 90 is drawn is that which is adapted for the graphic treatment required to give the sought for analyses and no further curves need be plotted.

Heretofore, so far as we are aware, a pan has been used as the immersion element attached to balance 10. We have discovered that some of the settled particles either missed the pan in settling or else slipped off it after having reached the same, thereby giving rise to serious errors. Therefore, in lieu of a pan we have provided an immersion element in the form of a cup 18a, Fig. 1, open at the top and suspended from the hook 18 by fine wires 78. The action of the cup is quite different from that of the pan type element heretofore proposed. Thus, it does not make any difference whether the suspension inside the cup settles or not, since the cup acts as a specific gravity bob and measures the change in specific gravity of the liquid suspension outside the cup, rather than the weight of material settled on its bottom. A further and important advantage of the cup is that by making it of thin metal foil, for example, .002 inch thick, as by electroplating copper onto a graphite-covered wax form and thereafter melting out the wax, the volume of the metal constituting the cup can be kept very small, whereby the variation in volume occasioned by temperature changes is negligible. Furthermore, it will be obvious that the thermal expansion of the liquid inside the cup and outside the cup will always be the same—a condition which is very difficult to fulfill if it is attempted to use a bob instead of a cup.

It is desirable in using any of our improved immersion elements that the entire element be submerged, not only to avoid errors due to a change in the volume of the element unsubmerged, but also to avoid surface tension effects. The use of a shorter cup of approximately the same diameter is indicated when it is desired to work within the shorter distance of settling. For example, a cup one-half as long as that shown in Fig. 1 would permit complete settling to the bottom thereof in considerably less time than is required for complete settling when using the longer cup and is useful when working in the range below one micron, for example.

For greatest accuracy a substantially uniform suspension should be made of the divided solid material. For this purpose any of the usual dispersing agents may be employed. For example, for measuring the size of chalk particles, the dispersing agent sold under the commercial name of DAXAD may be employed. In any case whether using a short or a long cup, the amount of material suspended should be such that when settled out, the gain in weight will be just sufficient to cause the stylus to move substantially the full distance across the chart.

It will be understood that our improved device will measure the size of particles which settle out, and that this is true whether the finer particles settle out or not.

It will be obvious that our improved device operates by recording the change in weight of the immersion element and that, if desired, the same device can be used to indicate loss of weight as well as gain; thus our improved device would be useful in measuring the rate of evaporation of a liquid, for example. In such case the photo cell relay 42 will close the circuit in which switch 79 is turned to wind the nut 25 up instead of down.

While we have illustrated and described in detail certain preferred forms of our invention, it is to be understood that changes may be made therein and the invention embodied in other structures. We do not therefore desire to limit ourselves to the specific construction illustrated, but intend to cover our invention broadly in whatever form its principle may be utilized.

We claim:

In a device for determining the size of particles in a liquid suspension by measurement of the rate of change of the specific gravity of such suspension brought about by the settling of the particles, said device having a balance having one arm movable with such change in gravity, a counterpoise and means actuated by said counterpoise for measuring such rate of change, the improvement which consists in the combination with the foregoing elements of a cup attached to said arm, said cup being comprised of a thin walled, straight sided cylinder closed at the bottom and open at the top and in use being entirely submerged in and filled with such suspension with its opening in proximity to the liquid level and extending vertically downward into the suspension.

NOEL OBENSHAIN.
WRIGHT M. WELTON.